Figure 1:
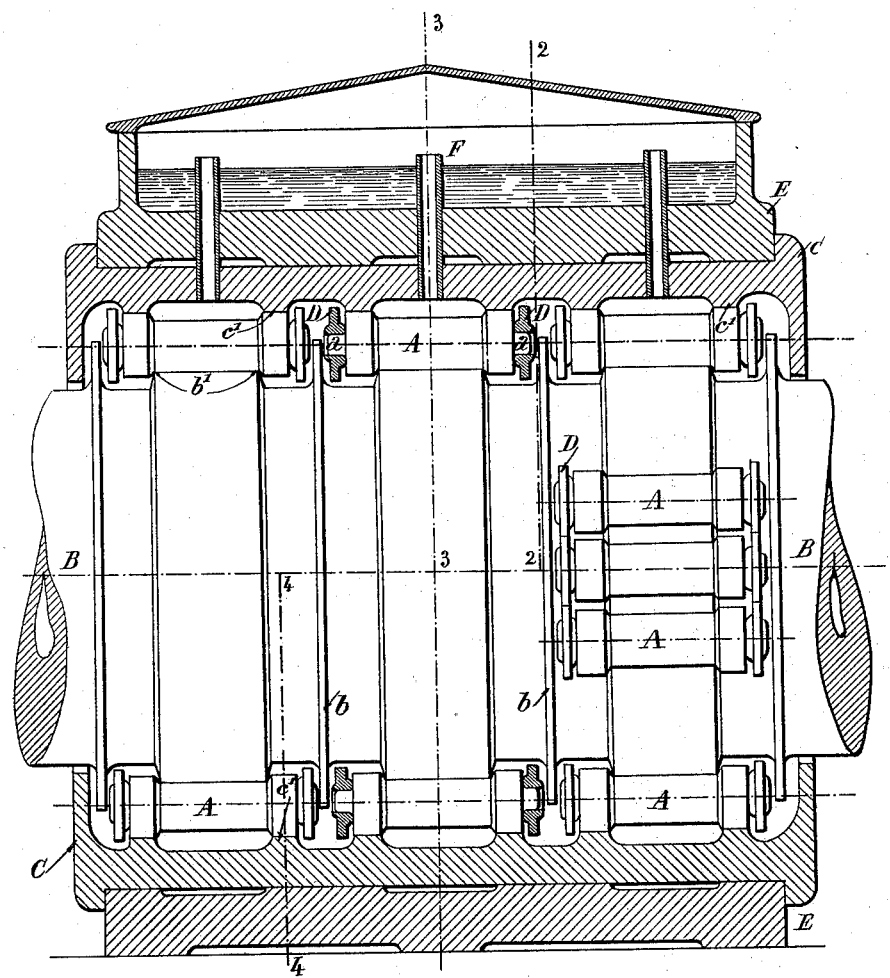

No. 609,526. Patented Aug. 23, 1898.
M. C. P. THIERRY.
ROLLER BEARING.
(Application filed Oct. 7, 1897.)

(No Model.) 8 Sheets—Sheet 1.

No. 609,526. Patented Aug. 23, 1898.
M. C. P. THIERRY.
ROLLER BEARING.
(Application filed Oct. 7, 1897.)
(No Model.) 8 Sheets—Sheet 3.

No. 609,526. Patented Aug. 23, 1898.
M. C. P. THIERRY.
ROLLER BEARING.
(Application filed Oct. 7, 1897.)
(No Model.) 8 Sheets—Sheet 5.

No. 609,526. Patented Aug. 23, 1898.
M. C. P. THIERRY.
ROLLER BEARING.
(Application filed Oct. 7, 1897.)

(No Model.) 8 Sheets—Sheet 6.

No. 609,526. Patented Aug. 23, 1898.
M. C. P. THIERRY.
ROLLER BEARING.
(Application filed Oct. 7, 1897.)
(No Model.) 8 Sheets—Sheet 7.

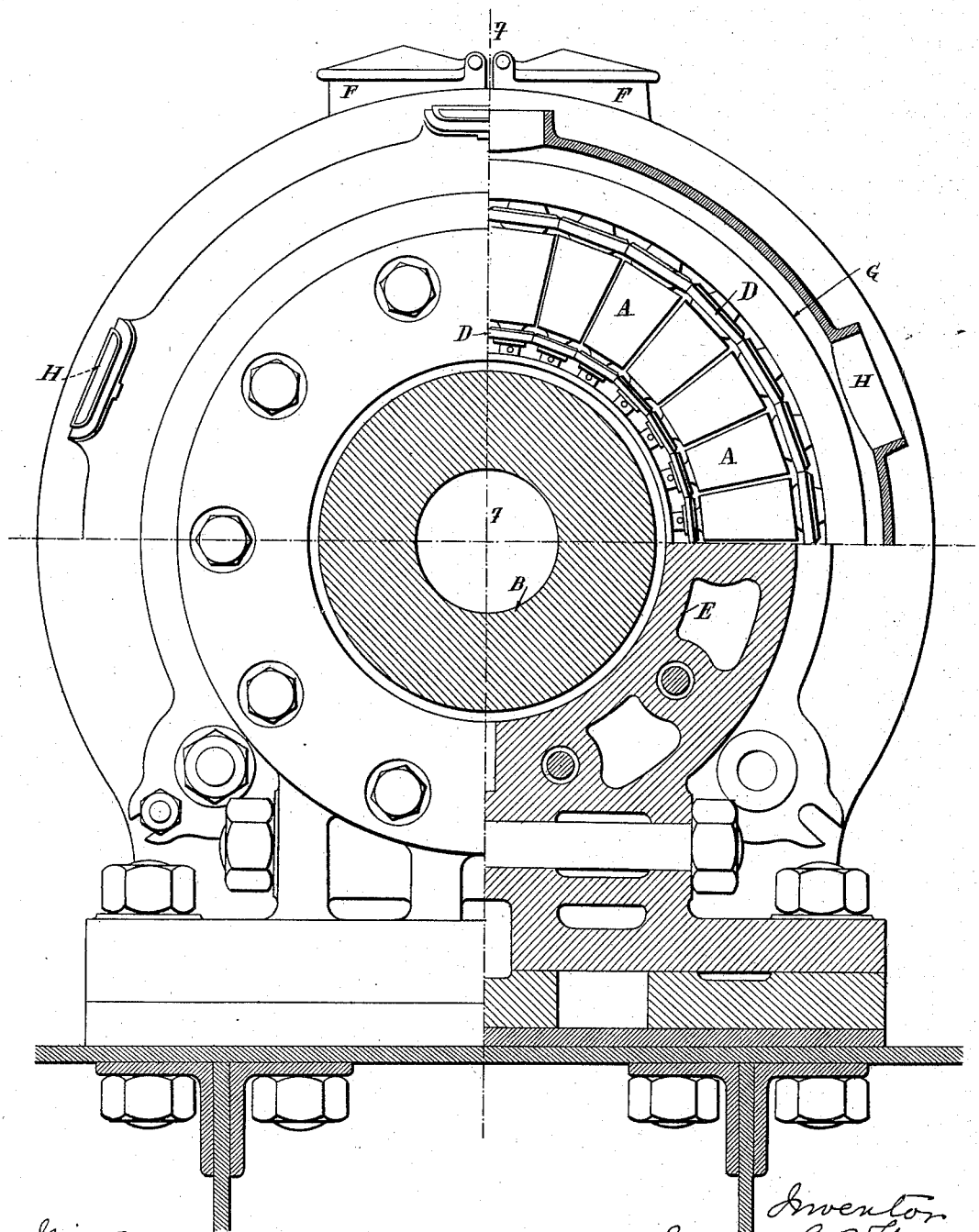

United States Patent Office.

MICHEL CHARLES PHILIPPE THIERRY, OF PARIS, FRANCE, ASSIGNOR OF THREE-FOURTHS TO CHARLES VICTOR THIERRY, GORDON DAVID STURROCK, AND FRANCIS FREDERICK HENRY LEWIS MENNONS, OF SAME PLACE.

ROLLER-BEARING.

SPECIFICATION forming part of Letters Patent No. 609,526, dated August 23, 1898.

Application filed October 7, 1897. Serial No. 654,387. (No model.) Patented in France June 4, 1896, No. 256,935, and March 8, 1897, No. 264,757; in Belgium June 4, 1896, No. 121,719; in Germany June 8, 1896, No. 90,976; in England June 8, 1896, No. 12,522; in Austria July 7, 1896, No. 1,249; in Hungary July 14, 1896, No. 6,497; in Switzerland November 24, 1896, No. 13,548; in Luxemburg November 24, 1896, No. 2,267; in Italy December 1, 1896, No. 43,271, and in Spain December 2, 1896, No. 20,042.

*To all whom it may concern:*

Be it known that I, MICHEL CHARLES PHILIPPE THIERRY, a citizen of the French Republic, residing at Paris, France, have invented certain new and useful Improvements in Roller-Bearings, of which the following is a specification.

My invention, which has been patented in France June 4, 1896, No. 256,935, and March 8, 1897, No. 264,757; in Belgium June 4, 1896, No. 121,719; in Germany June 8, 1896, No. 90,976; in England June 8, 1896, No. 12,522; in Austria July 7, 1896, No. 1,249; in Hungary July 14, 1896, No. 6,497; in Switzerland November 24, 1896, No. 13,548; in Luxemburg November 24, 1896, No. 2,267; in Italy December 1, 1896, No. 43,271, and in Spain December 2, 1896, No. 20,042, relates to certain improvements in roller-bearings adapted for various purposes, such as for pillow-blocks, thrust-bearings, foot-step bearings, axle-bearings for vehicles, and other purposes.

My invention may be stated, briefly, to consist in coördinating the motion of certain friction-rollers interposed between the rotary part and its bearings by means of bowls, disks, or the like of a larger diameter than that of the rollers and mounted on axle-pins of the rollers in order to keep the said rollers apart, the pins being of a comparatively small diameter to reduce the sliding friction to a minimum.

The rollers in some forms of my invention are made with two diameters, not with the intention of doing away with a non-existent friction, but with the object of apportioning the wear, as described in detail hereinafter—that is to say, to enable the wear to be thrown principally upon the part (journal or bearing) which for various reasons may be capable of supporting it to the best advantage.

Various arrangements of these roller-bearings may be employed, the rollers being placed in suitable casings containing an oil-bath and for foot-step bearings or the like preferably being conical. For thrust-bearings a combination of straight and conical rollers is employed, the one being placed at right angles or approximately right angles to the other.

The objects of my invention are to obviate as much as possible and in a simple manner the losses owing to friction occurring between the rollers where their generatrices come in contact; to obtain through the revolving rollers themselves an automatic and uniform lubrication of the parts subjected to friction by providing within the casing or bush of the bearing an oil-box, so that the rollers therein are immersed in oil or otherwise effectively lubricated; to maintain the rollers parallel both to each other and to the shaft by constructing them of different diameters and guiding them in their rolling motion by means of a regular way or track the rails of which are constituted by reduced portions or collars correspondingly arranged upon the shaft or bearing; to divide the wear between the shaft and bearing in such proportion as may be desired by imparting to the said double-diameter rollers an adequate line of profile when in revolution, and to divide roller-bearings into a number of parts or sections by the employment of very short rollers in juxtaposition instead of using bearings consisting of one piece only and using long rollers for the purpose, whereby any deviation, twisting, bending, or other similar alterations of shape are rendered less liable to occur.

Figure 2:
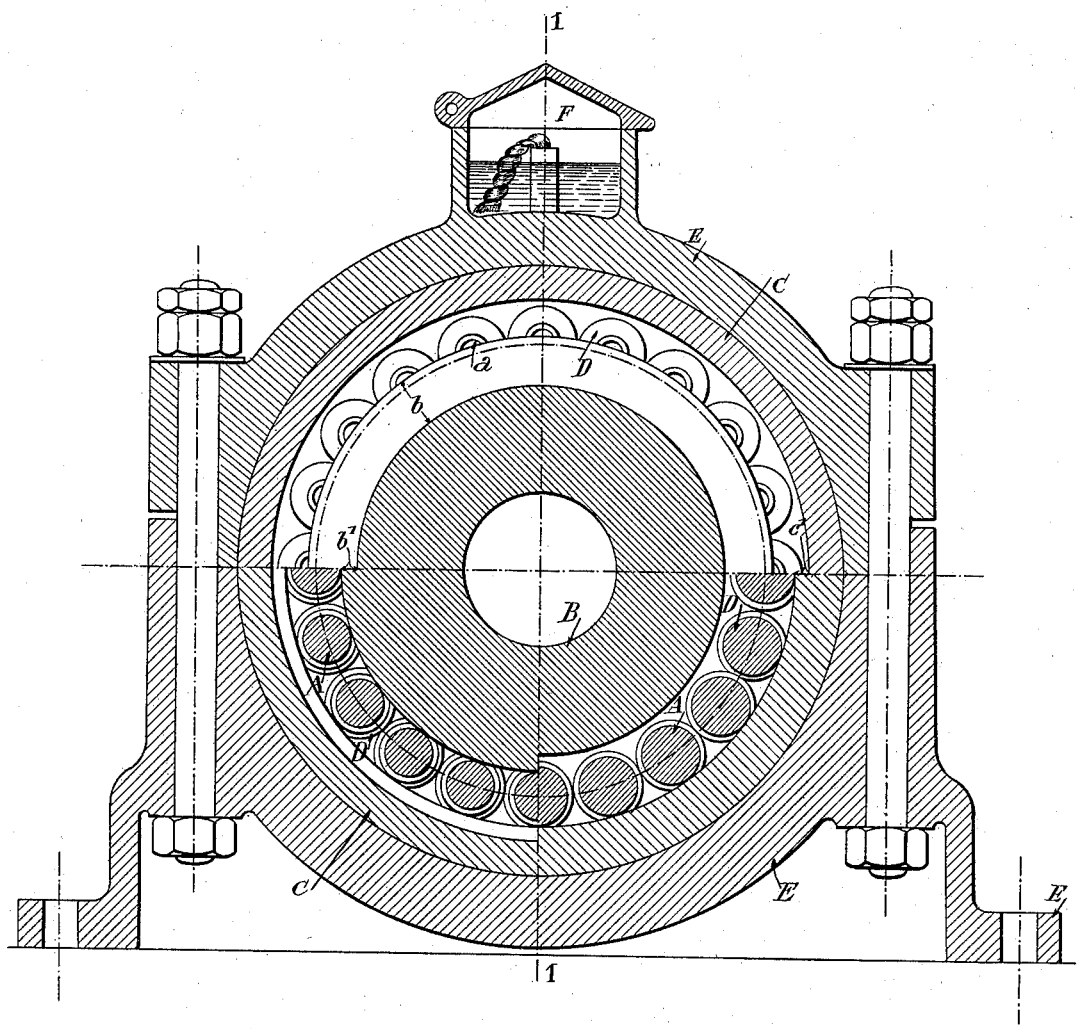
Figure 3:
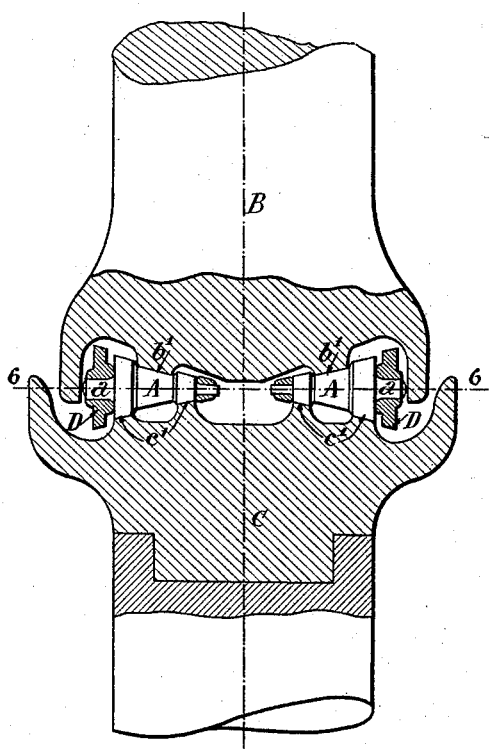
Figure 4:
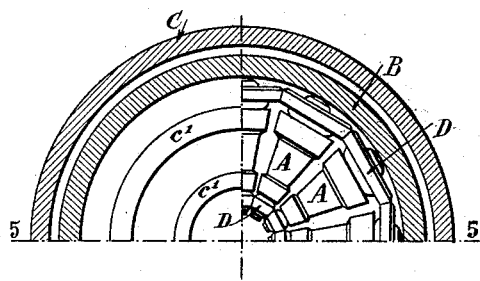
Figure 5:
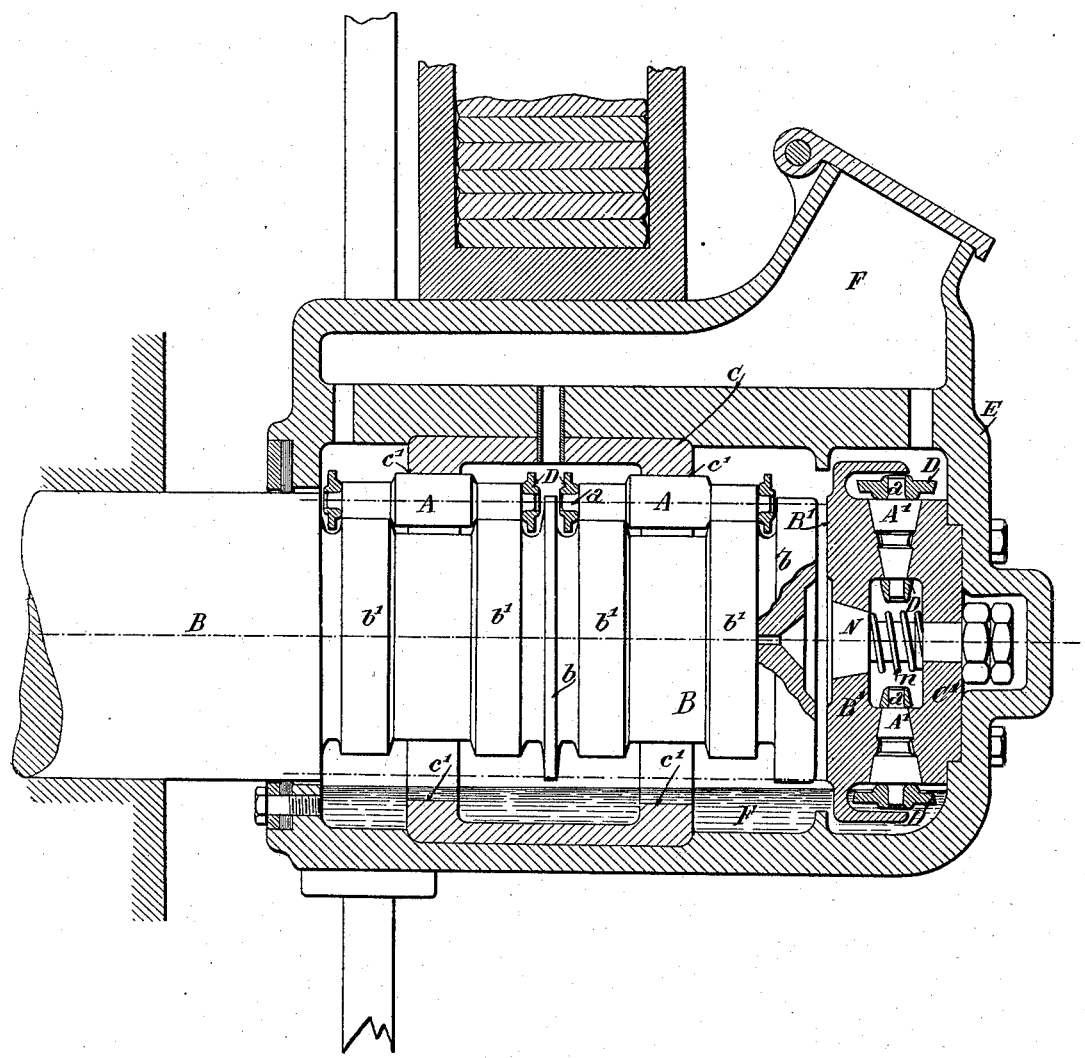
Figure 6:
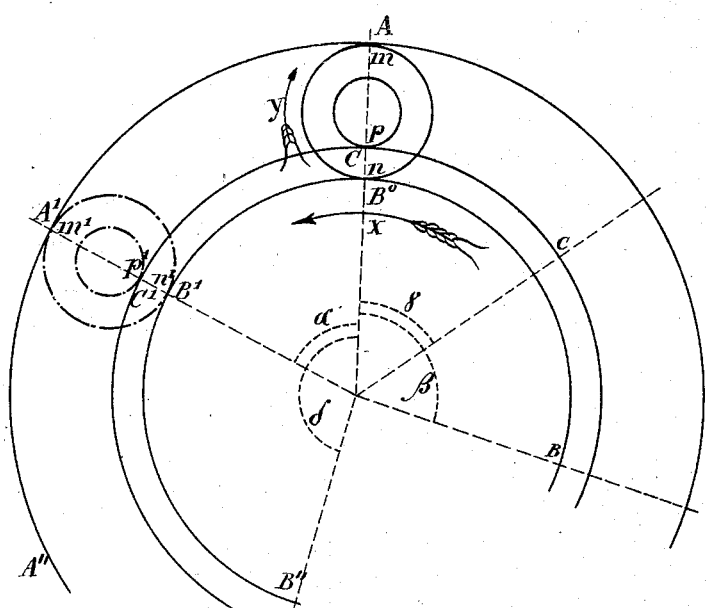
Figure 7:
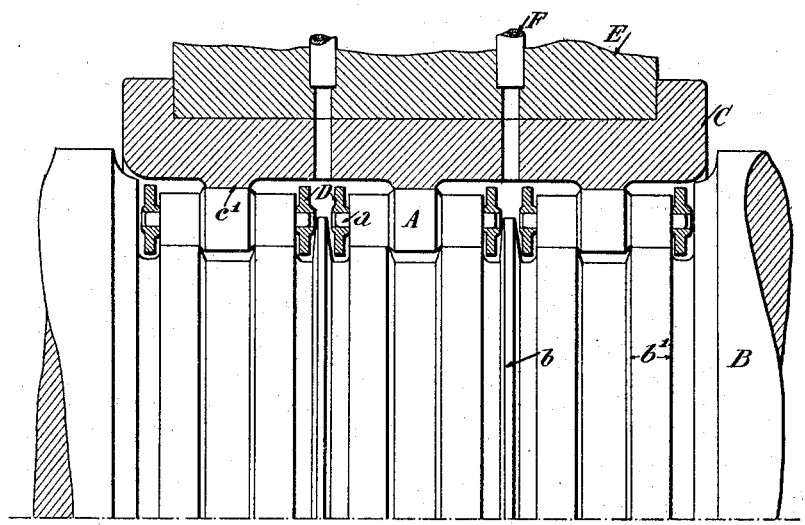
Figure 9:
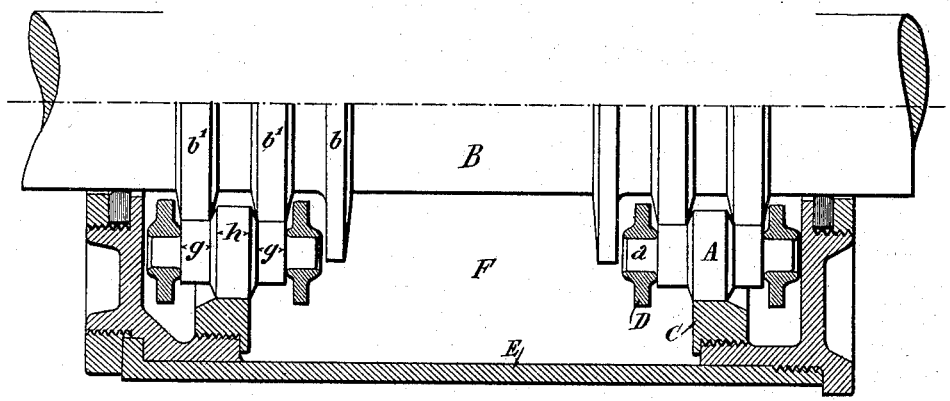
Figure 8:
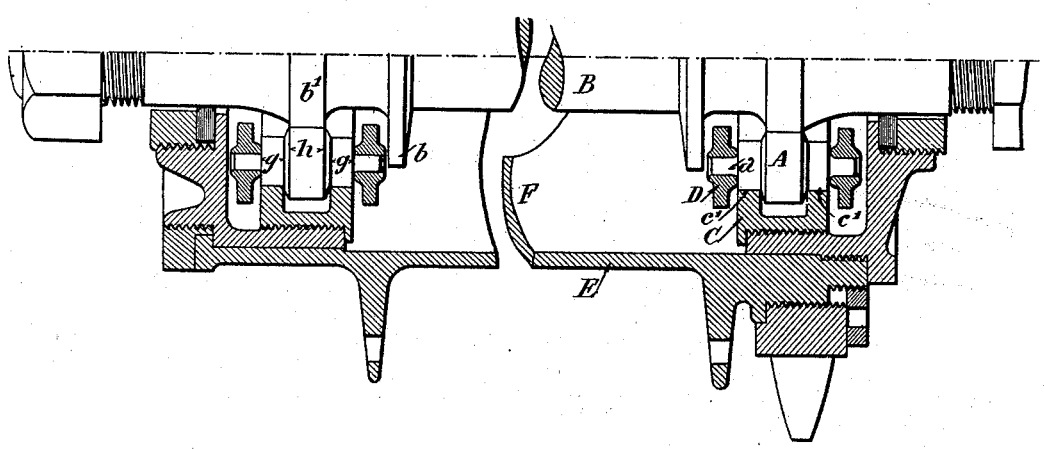
Figure 10:
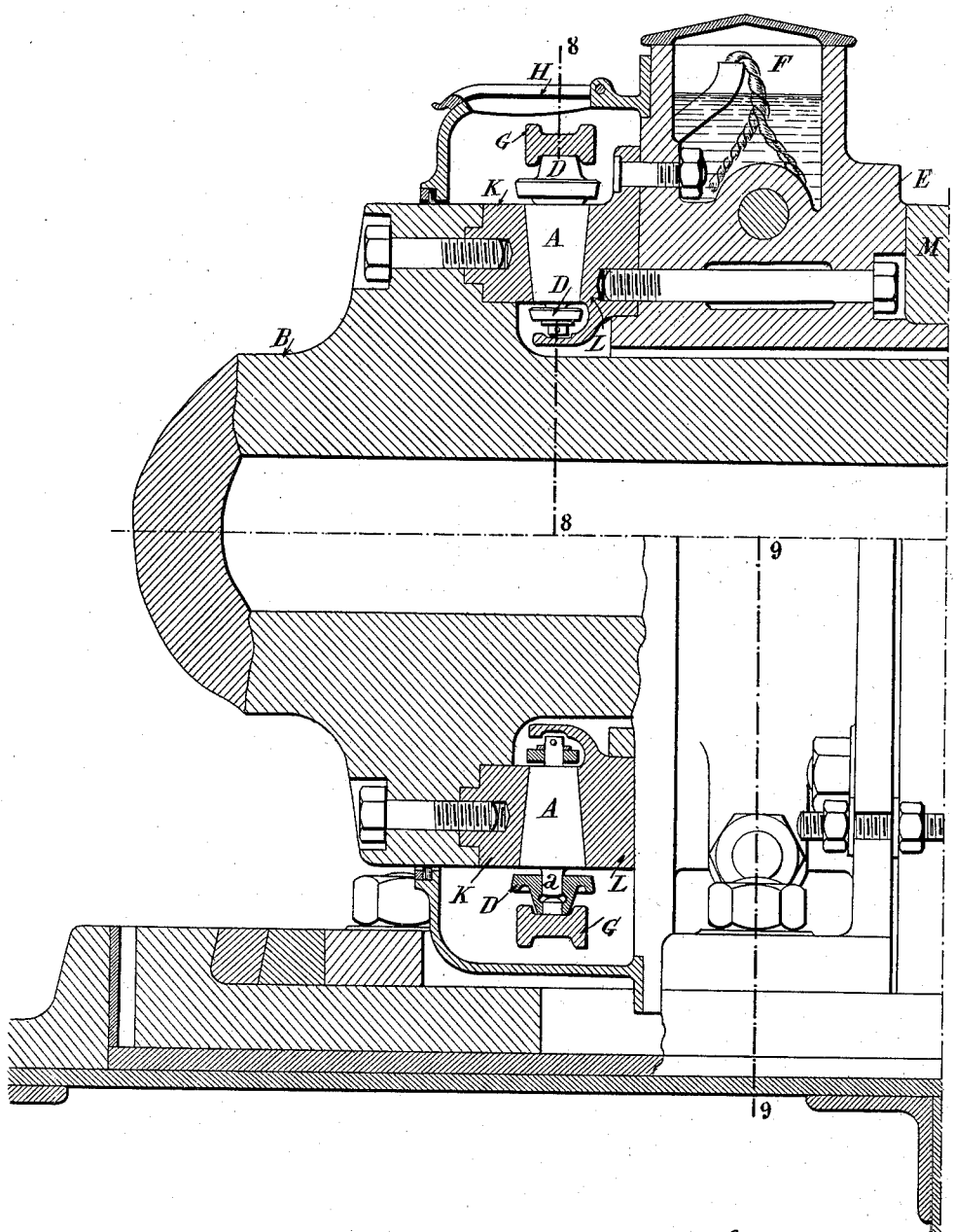

In the accompanying drawings, Figure 1 is a vertical longitudinal section upon line 1 1, Fig. 2, of a horizontal bearing for the driving-shaft of a marine engine, this bearing being typical of the bearings generally used for driving or for countershafting. Fig. 2 is a cross-section of the same bearing, the section in the upper half of the figure being taken in the plane indicated by the line 2 2, Fig. 1, the lower quarter on the left being on line 3 3, Fig. 1, and the lower quarter on the right-hand side on line 4 4, Fig. 1. Fig. 3 is a central vertical section on line 5 5, Fig. 4, of a step-bearing—as used for turbines, for example—embodying my improvements. Fig. 4 represents half a section on line 6 6, Fig. 3, the rollers being supposed to have been removed from the left-hand quarter. Fig. 5 is a central vertical section of an axle-box of a railway-vehicle, this roller-bearing arrangement being a combination of a cylindrical roller-bearing and a conical roller-bearing. Fig. 6 is a diagram of the roller-bearing arrangement illustrating the difference, as regards wear, between the ordinary single-diameter roller and the improved roller having two diameters. Fig. 7 is one half of a central vertical section of the axle-box of a locomotive-engine embodying my improvements. Fig. 8 is one half of a cental vertical section of the hub of the driving-wheel of a bicycle constructed in accordance with my invention. Fig. 9 is one half of a central vertical section of my roller-bearing arrangement as applied to the pedal-bracket of a bicycle. Fig. 10 is a half-sectional elevation of a thrust-block for the driving-shaft of a marine engine, the two halves being symmetrical, the part shown in section being taken on line 7 7, Fig. 11; and Fig. 11 in the left-hand half is an end view of the same bearing, while the right-hand half is a cross-section thereof, the upper quarter being drawn in section upon line 8 8, Fig. 10, and the section of the lower quarter being taken on line 9 9, Fig. 10.

In all the figures save Fig. 5 the same letters of reference designate like parts.

In order to obviate as effectually as possible the losses caused by the friction between the rolling bodies, I prevent such bodies from coming in contact with each other by means of the following arrangement: Each of the rollers A (whether they are cylindrical or conical) interposed between the shaft B and its box or brass C, contained in a casing or housing E, is provided at each end with an axial journal $a$ of very small diameter, and upon each of these journals there is mounted a disk or roller D, which is free to turn thereon, the diameter of such disk being larger than that of the bearing-rollers A. As is clearly shown in Fig. 1 on the right, as well as at the lower part of Fig. 2, the bearing-rollers A in this arrangement do not meet at any point, the only parts in contact with each other being the disks or rollers D. The only point, therefore, where a sliding friction can take place here is between the journals $a$ and the disks or rollers D. Now as the diameter of these journals is greatly reduced and as consequently the peripheral speed of the same is inconsiderable it follows that the friction between said journals and the disks is also reduced to a very low degree.

The disks or rollers D at their peripheries should not, of course, touch either the box or bush C or the shaft B, and to insure this the box or bush C is provided with two collars $c'$ and the shaft B with a collar $b'$ of a suitable diameter, or obviously the arrangement may be reversed.

In Figs. 1 and 2 a series of three sets of rollers A is employed, together with the parts necessary, described above.

The disks or rollers D may be prevented from slipping off their journals $a$ either by collars $b$ on the shaft or by similar collars or flanges formed on the bush or brass. I prefer, however, to place these collars upon the revolving body, so as to get less friction between the bearing-rollers and the guiding-wall, for generally speed is the less important factor in the case, being simply the difference between the speed of displacement of the said guiding-wall and the speed of motion of the roller, whereas in the reverse case—that is to say, where the guiding-wall remains stationary—the speed factor equals the speed of the rollers without any diminution.

The employment of additional rollers as means for separating the bearing-rollers from each other is an extremely advantageous feature and one that greatly assists the fitting of roller-bearings in the operative position, as the bearing-rollers are independent of each other from the first and continue to be throughout and are capable of being inserted between the shaft or the like and the brass or bush, one at a time, in succession, which facility none of the other roller-bearings hitherto known to me affords. The employment, on the other hand, of rings, collars, lanterns, or other similar devices as means of separation or division between the rollers greatly enhances the difficulty of adjustment and in most cases renders it difficult or impossible to fit the roller-bearing in the proper working position. Extra rollers as means for separating the bearing-rollers from each other offer also the great advantage of enabling the roller-bearing arrangement to be divided into fractions as it were, or, in other words, to be formed in any desired number of groups or series of bearing-rollers. Thus in Figs. 1 and 7, for example, I have divided the arrangement into three parts, and yet have not by so doing rendered the fitting together of the mechanism more difficult than it would otherwise be, since the bearing-rollers, owing to the provision of the additional rollers, are and remain independent of each other; and as to the superiority of a roller-bearing arrangement consisting of a number of sets or groups of short rollers over one formed of a single group of long rollers it may be accounted for by the fact that the rollers thus divided are, as it were, linked or pivoted together, so that any deviations that may occur are greatly reduced in extent and there is less possibility of torsion or bending.

The second part of my invention refers to means for apportioning the wear at pleasure to the shaft and the brass or bearing proper and for keeping the bearing-rollers strictly parallel to each other. The arrangement I employ for this purpose consists, as described, in constructing the bearing-rollers (whether cylindrical or conical) of two different diameters, so that each roller may roll upon the spindle or shaft with the portion having one diameter and upon the brass or bearing proper with its other diameter.

I am aware that double-diameter bearing-rollers have already been proposed, their object, however, being different from that which I here seek to accomplish, as specified above. Let there be a roller-bearing arrangement such as shown in Fig. 6, wherein a single-diameter bearing-roller interposed between the two tracks A A' A'' and B B' B'' is moved around in the direction of the arrow $y$ on the internal track, which is revolving in the direction of the arrow $x$, the external track being stationary. When the bearing-roller has completed one revolution about itself, the point $m$ of such roller, in contact with the point A of the external track, will have come round to $m'$, where it meets the point A', the situation of which in relation to the point A is such that the arc A A' is developed of the same length as the development of the periphery of the roller. The angle $\alpha$ gives the angular displacement of the bearing-roller during each revolution of the same about itself. When the roller has completed this revolution, its point $n$, being in contact with the point B°, will have met the point B of the internal (moving) track, and as after the completion of such revolution of the roller the point $n$ will have reached the position $n'$, B will necessarily have come round to B', and the angular displacement of the point B may be determined by adding up the sum of the angles $\alpha$ and $\beta$, $\beta$ being the angle corresponding to the arc B° B, the developed length of which equals the development of the circumference of the bearing-roller. As for the point B°, after the same revolution of said roller it will have come round to B'', the situation of which is such that the angle $\delta$ equals the sum of the angles $\alpha$ and $\beta$.

If I take a double-diameter roller traveling along the external stationary track A A' with its larger diameter and along an internal track C C' with its smaller diameter, then the point $m$ of the bearing-roller, whenever such roller completes a revolution about itself, will invariably come round to the position $m'$; but the point $p$, which by this time will have reached the position $p'$, will then be in contact with the point C, the situation whereof on the inner track is such that the length of the arc C° C equals the developed circumference of the small diameter of the bearing-roller. Therefore the point C of the inner or movable track will during one revolution of the said roller have traveled through the space C C' represented by the sum of the angles $\alpha$ and $\gamma$. Upon comparing these data it will be seen that in the former case the inner or moving track will have turned at an angle $\alpha + \beta$, while in the latter case its angle of rotation will be only $\alpha + \gamma$.

From the foregoing demonstration it follows that if it be desired to reduce the speed or motion of the movable track in relation to the motion of the roller it is necessary that such roller should have two diameters, and, further, that the more the smaller diameter of the two is reduced the more also will the speed of the shaft in relation to the speed of displacement of the roller be reduced, and consequently the wear of the movable track or path will be less as compared with the wear of the bearing-rollers and the stationary path or track. Double-diameter bearing-rollers, however, afford another means of transferring the wear, so to speak, from the movable track onto the other parts of the mechanism, for inasmuch as the rollers travel along the outer track with their large diameter only and along the inner path solely with their smaller diameter if different lengths or different sums of lengths be imparted to the contact generatrices, respectively, then an additional means of regulating or controlling the wear will virtually be obtained as a result. Figs. 8 and 9, for example, clearly show this, the sum of lengths of the generatrices $g\ g$ exceeding the length of the generatrix $h$. Obviously in an ordinary bicycle-pedal mechanism, for instance, any one identical point of the path of the revolving shaft will far more often pass over the bearing-roller than any one identical point of the external stationary path. The shaft, too, therefore tends to wear more quickly than the bush or bearing; but inasmuch as I arrange (see Fig. 9) for the bearing-surfaces of the rollers upon the shaft to be of greater length than the bearing-surfaces of the rollers upon the stationary track the wearing-surface on the roller may be so extended that, notwithstanding the difference of diameters and velocities, the wear may, if required, affect the shaft and bush alike. This possibility of transferring a portion of the wear of the movable track to the other parts of the mechanism is particularly important in connection with, say, the rolling-stock of railways, where a bearing or bush may be more readily replaced than a shaft.

Figs. 1, 5, 7, 8, and 9 further show that double-diameter rollers may also assist in keeping bearing-rollers parallel to each other, for should any one of such rollers from any cause show a tendency to shift out of the parallel position the preferably conical or beveled shoulders of the collars $b'$ of the shaft, Fig. 9, or of the collars $c'$ of the bearing C, Fig. 8, which constitute the real guides of the bearing-roller, would counteract such tendency. The same shoulders also prevent any displacement of the bearing-rollers through side pressures—that is to say, axial pressures. The junction between the parts of a roller differing in diameter is preferably of conical shape, but yet made to taper differently from what the shoulders of the collars $b'$ (or $c'$, as the case may be) do, so as to avoid friction.

Fig. 8, which is a section of the hub of a cycle driving-wheel, shows that it is also feasible to make the rollers travel on the shaft with their larger diameters and on the external path or track with their smaller diameters. In this instance it is the internal path that is stationary.

In the case of pivots or step-bearings, Fig. 3, thrust-blocks or abutment-bearings, Fig. 10, and the like—in fact, wherever conical bearing-rollers are used—such rollers may be constructed with two different diameters—that is to say, they may be either conical and plain or conical and grooved. The surfaces of one diameter are made to travel along the fixed track, while the surfaces of the other diameter move on the movable track, the shape of such rollers in section being such as will insure the desired distribution of the wear.

One important advantage which my roller-bearing arrangement has in common with others is that it enables the parts subjected to friction to be automatically and uniformly lubricated by providing within the casing or box E an oil-reservoir F, into which the rollers in motion drive or dip at each turn, as shown in Fig. 5, thus entering the oil-supply and carrying a portion of it away with them. In this figure the rollers are omitted in the lower part. Or in place of this arrangement the oil-reservoir F may supply lubricant to the rollers by a wick, as shown in Fig. 2.

I have deemed it necessary to illustrate the various arrangements in the drawings, so as to show to a limited extent the applicability of my roller-bearing arrangements, the scope of which, as will be seen, extends over a wide range, including cycles, road-vehicles, railway-carriages, and, indeed, the driving-shafts of the engines of the largest vessels, providing the arrangement is properly adapted to the special requirements of each case.

My invention enables me to make the bushes or brasses of bearings all in one piece wherever this may be a desideratum, as, for example, in the case of cycle pedal-brackets and wheel-axles, Figs. 8 and 9. This construction will be readily understood without any further explanation by referring to the drawings, and it will further be seen that the arrangement offers the advantage of being incapable of getting out of order, as it is both protected from the air and from dust, while being to a large extent proof against wear.

Fig. 5 represents the roller-bearing arrangement for a railway vehicle axle-box and shows that I am in a position to combine a cylindrical roller-bearing with a conical abutment or thrust roller-bearing. There is no appreciable friction in this box. In the curves of the line the side pressure is absorbed by the conical abutment. The cylindrical rollers are of such a shape that under the action of the axle they are capable of sliding axially within the casing. The construction of the cylindrical roller-bearing is the same as that which has been described before. The conical thrust roller-bearing is not unlike a step-bearing, the fixed track C' and the movable track B' being connected by a bolt N, having a beveled or conical head and a spiral spring $n$ around its body portion. In the movement of the vehicle caused by the curves of the line the end of the axle B abuts against the face of the piece B', which it takes round with it as it revolves. The spring $n$ is thus compressed slightly, and as the piece B' is no longer in contact with the cone it revolves freely against the rollers A'.

In Figs. 10 and 11 a collar or ring G is provided to obviate any displacement of the rollers A, though I have assumed the rollers to be precluded from any radial displacement. The rollers might, however, be double-diameter rollers—$i.\ e.$, be provided with grooves, as shown, for instance, in Figs. 3 and 4—and the radial pressure, if present, would then be absorbed by the resistance of the collars entering such grooves, so that said ring would become unnecessary or would only serve to prevent the disks or rollers D from slipping off their journals.

The thrust-bearing has a double-roller arrangement, one part of which serves for the forward thrust and the other for the backward thrust, both sets of rollers being visible through windows or light-ports H, the interior being suitably illuminated—say by electric light.

The rolling paths or tracks K and L are formed upon the shaft and bush, respectively. The two halves of the abutment-bearing are capable of moving out of place in relation to each other for purposes of adjustment; but after they have once been adjusted a circular block or wedge M, consisting of several pieces, is inserted between them, whereupon the adjusting-bolts and set-screws are tightened. The whole arrangement may be fitted together or taken to pieces both quickly and readily and lubricated automatically and uniformly with oil from the boxes F, no provision being requisite for cooling, as there is no risk of the parts becoming overheated.

Without limiting myself to the precise arrangement and construction of parts shown and described, I claim—

1. In a roller-bearing, the combination with the opposing parts of the bearing, of interposed bearing-rollers provided at their ends with axial pins, and disks of larger diameter than the rollers loosely mounted on said pins and bearing against one another, substantially as described.

2. In a roller-bearing, the combination with the shaft and its box or casing, of interposed bearing-rollers provided at their ends with axial pins of comparatively small diameter, and disks of larger diameter than the rollers loosely mounted on said pins and bearing against one another to keep the rollers apart, substantially as described.

3. In a roller-bearing, the combination with the shaft and its box or casing, of interposed double-diameter bearing-rollers provided at their ends with axial pins of comparatively small diameter, and disks of larger diameter than the maximum diameter of the rollers loosely mounted on said pins and bearing against one another to keep the rollers apart, substantially as described.

4. In a roller-bearing, the combination with the main relatively-movable parts thereof, of interposed conical double-diameter bearing-rollers provided at their ends with axial pins of comparatively small diameter, and disks of larger diameter than the maximum diameter of the rollers loosely mounted on said pins and bearing against one another to keep the rollers apart, substantially as described.

5. In a roller-bearing, the combination with the shaft and its box or casing, of interposed bearing-rollers provided at their ends with axial pins of comparatively small diameter, disks of larger diameter than the rollers loosely mounted on said pins and bearing against one another to maintain the rollers separated, and collars arranged adjacent to said disks and adapted to confine them on said pins, substantially as described.

6. In a roller-bearing, the combination with the shaft and its box or casing, of interposed bearing-rollers having axial pins of comparatively small diameter at their ends, disks of larger diameter than the rollers loosely mounted on the pins and bearing against one another to keep the rollers apart, and collars on the shaft adapted to confine the disks on said pins, substantially as described.

7. In a roller-bearing, the combination with the shaft and its box or casing, of two series of bearing-rollers interposed between said shaft and casing at right angles to each other, the rollers of one series being cylindrical and those of the other series conical, axial pins of comparatively small diameter on the ends of said rollers, and disks of larger diameter than the rollers loosely mounted on said pins and bearing against one another to maintain the rollers separated, substantially as described.

8. In a roller-bearing, the combination with the fixed and movable paths or tracks, of rollers with two diameters interposed between said paths or tracks, only the portions of said rollers which are of the same diameter being in contact with each path respectively, the diameters and lengths of the generatrices of the rollers being such that the bearing surfaces or areas, determined by them, shall be in the proportion required to apportion the wear of the two paths or tracks, notwithstanding differences in their surfaces and nature, substantially as set forth.

In testimony whereof I have signed my name to this specification in the presence of two subscribing witnesses.

MICHEL CHARLES PHILIPPE THIERRY.

Witnesses:
JOHN H. MILES,
EDWARD P. MACLEAN.